US012750390B2

(12) United States Patent
Patra

(10) Patent No.: US 12,750,390 B2
(45) Date of Patent: Sep. 29, 2026

(54) ASSET CRAWLING WITH INTERNET ARCHIVES FOR ENHANCED WEB APPLICATION SCANNING

(71) Applicant: Fortinet, Inc., Sunnyvale, CA (US)

(72) Inventor: Hitesh Patra, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 66 days.

(21) Appl. No.: 18/615,389

(22) Filed: Mar. 25, 2024

(65) Prior Publication Data

US 2025/0301009 A1 Sep. 25, 2025

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC ........................ H04L 63/1433; H04L 63/1441
USPC ........................................................ 726/25
See application file for complete search history.

(56) References Cited

U.S. PATENT DOCUMENTS 11,620,354 B2 * 4/2023 Murray .................. H04L 63/08 707/706
11,651,083 B2 * 5/2023 Youngberg ......... G06F 11/3698 726/25
11,651,084 B2 * 5/2023 Youngberg ........... G06F 21/552 726/22
2011/0283359 A1 * 11/2011 Prince ................ G06Q 30/0241 726/23
2012/0227110 A1 * 9/2012 Gartside ................. H04L 67/02 726/22
2014/0137228 A1 * 5/2014 Shema .................... H04L 67/02 726/25

* cited by examiner

*Primary Examiner* — Teshome Hailu
(74) *Attorney, Agent, or Firm* — Law Office of Dorian Cartwright; Dorian Cartwright

(57) ABSTRACT

A scan request for a domain includes at least some dynamic pages that are no longer available on a front end of a web host. Responsive to not being available on the front end of the web host, a list of URLs is retrieved from an archive server that stores snapshots of the dynamic pages from when they were available on the front of the web host. The list of retrieved URLs is examined, with a back end of the web host, for vulnerabilities. Responsive to identifying at least one vulnerability on at least one of the dynamic pages, a security action is taken with respect to the at least one dynamic page.

20 Claims, 5 Drawing Sheets

430

ASSET CRAWLING WITH INTERNET ARCHIVES FOR ENHANCED WEB APPLICATION SCANNING

FIELD OF THE INVENTION

The invention relates generally to computer networks, and more specifically, for asset crawling with Internet archives for enhanced web application scanning.

BACKGROUND

As of the current state, Internet crawlers actively scan web applications using the latest data. However, when functionality has been removed or hidden on a front end of a web application, associated APIs may still work and continue to function with valid URLs on a back end. Conventional crawlers, focusing on active scanning, may overlook the functions that no longer exists in the current state of the application.

Problems can arise when the registration feature had been previously crawled by the Internet archive services, and the URL is still valid. Although the front end removal makes the feature seem nonexistent to an active crawler, passive crawling can retrieve this specific URL from archival services. Malicious scans on this URL can effectively broaden the attack surface.

What is needed is a robust technique for asset crawling with Internet archives for enhanced web application scanning.

SUMMARY

To meet the above-described needs, methods, computer program products, and systems for asset crawling with Internet archives for enhanced web application scanning.

In one embodiment, in real-time, a scan request for a domain includes at least some dynamic pages that are no longer available on a front end of a web host. Responsive to not being available on the front end of the web host, a list of URLs is retrieved from an archive server that stores snapshots of the dynamic pages from when they were available on the front of the web host.

In another embodiment, the list of retrieved URLs is examined, with a back end of the web host, for vulnerabilities. Responsive to identifying at least one vulnerability on at least one of the dynamic pages, a security action is taken with respect to the at least one dynamic page.

Advantageously, computer networks are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for asset crawling with Internet archive services for enhanced web application scanning. The following disclosure is limited only for the purpose of conciseness, as one of ordinary skill in the art will recognize additional embodiments given the ones described herein.

Figure 2:
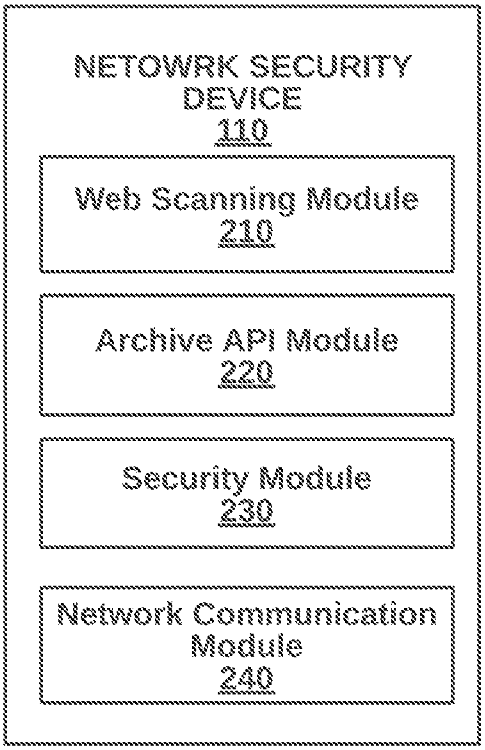
FIG. 2 is a more detailed block diagram illustrating a network security device of the system of FIG. 1, according to one embodiment.
Figure 3:
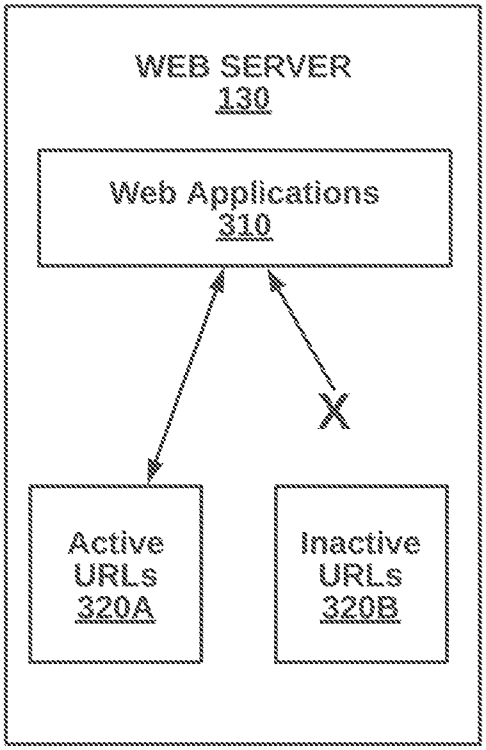
FIG. 3 is a more detailed block diagram illustrating a web server of the system of FIG. 1, according to one embodiment.

I. Systems for Enhanced Web Scanning (FIGS. 1-3)

Figure 1:
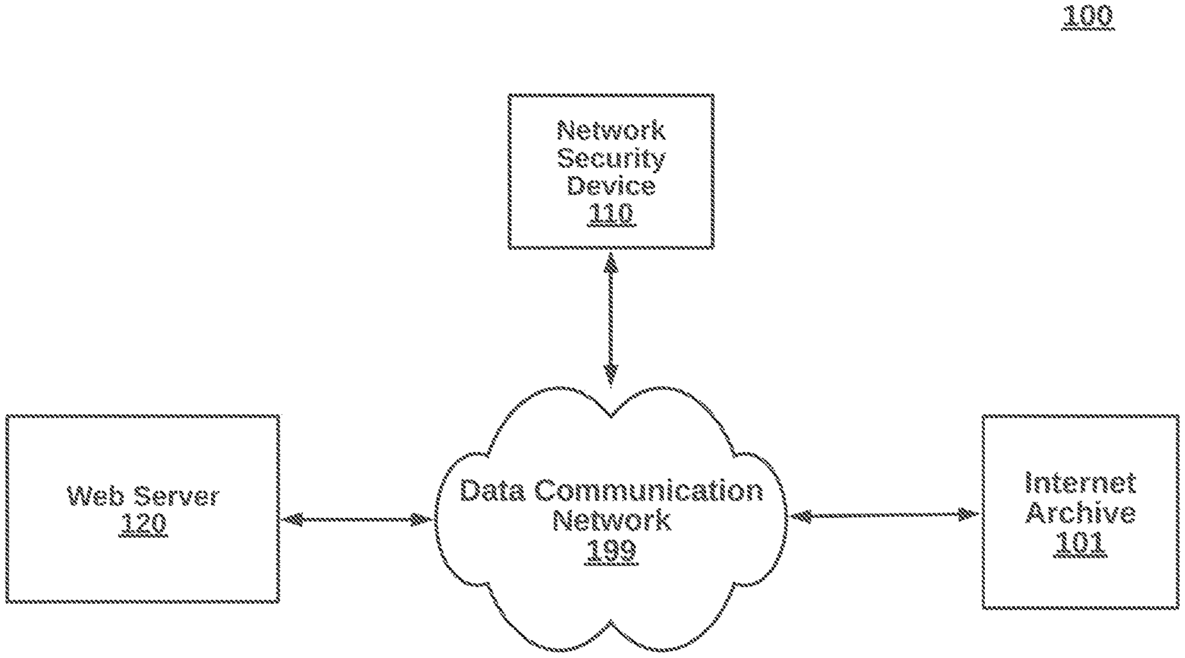
FIG. 1 is a high-level block diagram illustrating aspects of a system coordinating for asset crawling with Internet archives for enhanced web application scanning, according to some embodiments.
Figure 6:
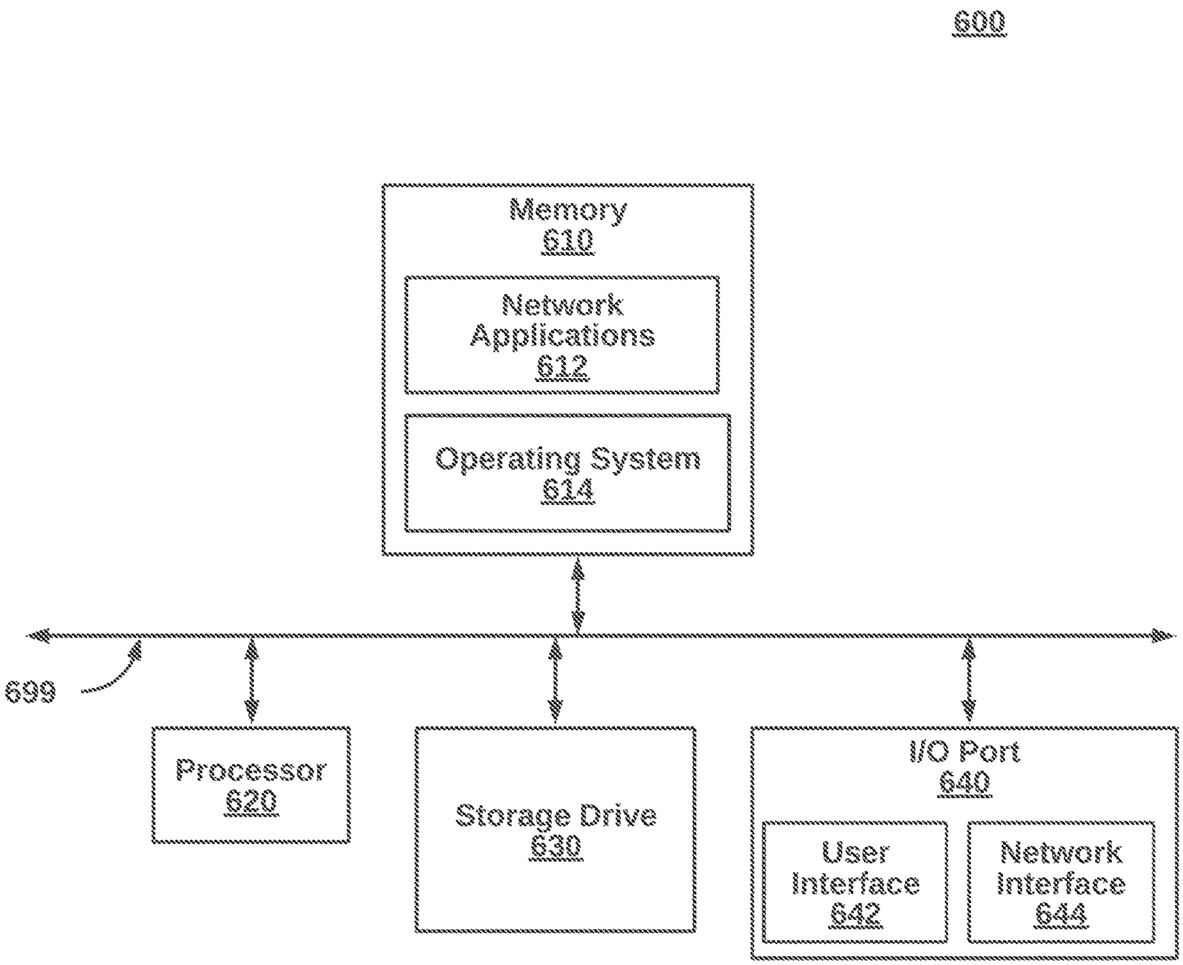
FIG. 6 is a block diagram illustrating an example computing device for the system of FIG. 1, according to one embodiment.

FIG. 1 is a high-level block diagrams illustrating a system 100 for asset crawling with Internet archives for enhanced web application scanning, according to an embodiment. The system 100 includes a network security device 110 and a web server 120, on a data communication network 199. An Intent archive 101 is coupled to the data communication network 199 along with potentially malicious web scanning devices. Other embodiments of the system 100 can include additional components that are not shown in FIG. 1, such as routers, switches, network gateways, and firewalls, access points and stations. Further, there can be more network security devices, web servers, Internet archives, and malicious scanning devices. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., network security device 110, web server 120 and Internet archive 101). The components can also be connected via wireless networking (e.g., wireless stations). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use, for example, IPV4 of IPV6 address spaces.

In one embodiment, the network security device 110 protects against vulnerabilities for URLs that are no longer actively connected to web applications. Rather than just active scanning, techniques for passive scanning identify URLs missed by active scanning but are still accessible to web requests. For example, a web application can be updated to include a new URL for new functionality, but the previous URL is disconnected from the web application without being deleted or deactivated. Consequentially, when a user operating from a cached web browser or other source that does not have updated URLs requests the old URL, they could be exposed to vulnerabilities that are not being actively scanned. The network security device 110, once discovering vulnerabilities, can close the gaps by taking security actions.

In one embodiment, the network security device 110 operates on an enterprise network to protected web servers on the enterprise network. In other embodiments, the network device 110 is a third-party service (e.g., SaaS) operating from the cloud to protect web servers operated by different clients of the service. Further, the network security device 110 can be a dedicated physical device, or a process operating in tandem with other services, such as a firewall. Additional embodiments of the network security device 110 are described below with respect to FIG. 2.

Web server 120 can respond to requests from devices seeking use of web applications, web sites and other resources. In one case, an HTTP request is received from a user device on the Internet or from a LAN, and a response includes content of a URL for display on the user device. As shown in FIG. 3, the web server 120 runs web applications 310 relying upon active URLs 320A. Even though non-active URLs 320B are not run by web applications 310, they still exist and are accessible to requests. In some cases, a web application has been updated in a manner that no longer makes use of an active URL, thereby making it non-active. In other cases, URLs can be drafts that are being tested prior to becoming active. In still other cases, URLs can be private or hidden from crawlers.

Internet archive 101 can be a database populated by web crawling by archives, search engines, directories and other services (e.g., Wayback Machine or Archive-It). The services can be public, such as Google search engine, or private to an enterprise. A dynamic URL can be accessed at one point in time from active web scanning and stored for later access, even if not available to active web scanning. For example, a news website constantly changes its front page with breaking news, so an archive service can store past front pages after being updated. Many other forms of archival services are possible.

FIG. 2 is a more detailed block diagram illustrating the network security device 110 of the system of FIG. 1, according to one embodiment. The deceptive proxy device 110 includes a web scan module 210, an archive API module 220, a security module 230 and a network communication module 240. The components can be implemented in hardware, software, or a combination of both.

The web scan module 210 receives, in real-time, a scan request for a domain that includes dynamic pages. The dynamic pages may no longer available on a front end, for example, as shown by inactive URLs 320B of web applications 310 hosted on the web server 130 (as shown in FIG. 3). In this case, just active URLs 320A are scanned. Active URLs can become inactive for many different reasons, including being replaced by updated dynamic URLs, removal of web application features making associated URLs no longer relevant, relocated web content, deactivated URLs, and the like.

The archive API module 220 to, responsive a URL to not being available on the front end of the web host, retrieves URLs from an archive server that stores snapshots of the dynamic pages from when they were available on the front of the web host.

The security module 230 can check the list of retrieved URLs, with a back end of the web host, for vulnerabilities, and take necessary security measures. The URL can be blocked, quarantined, flagged, or the like.

The network communication module 240 handles protocols and APIs necessary for communication over a physical channel.

Ii. Methods for Enhanced Web Scanning (FIGS. 4-5)

Figure 4:
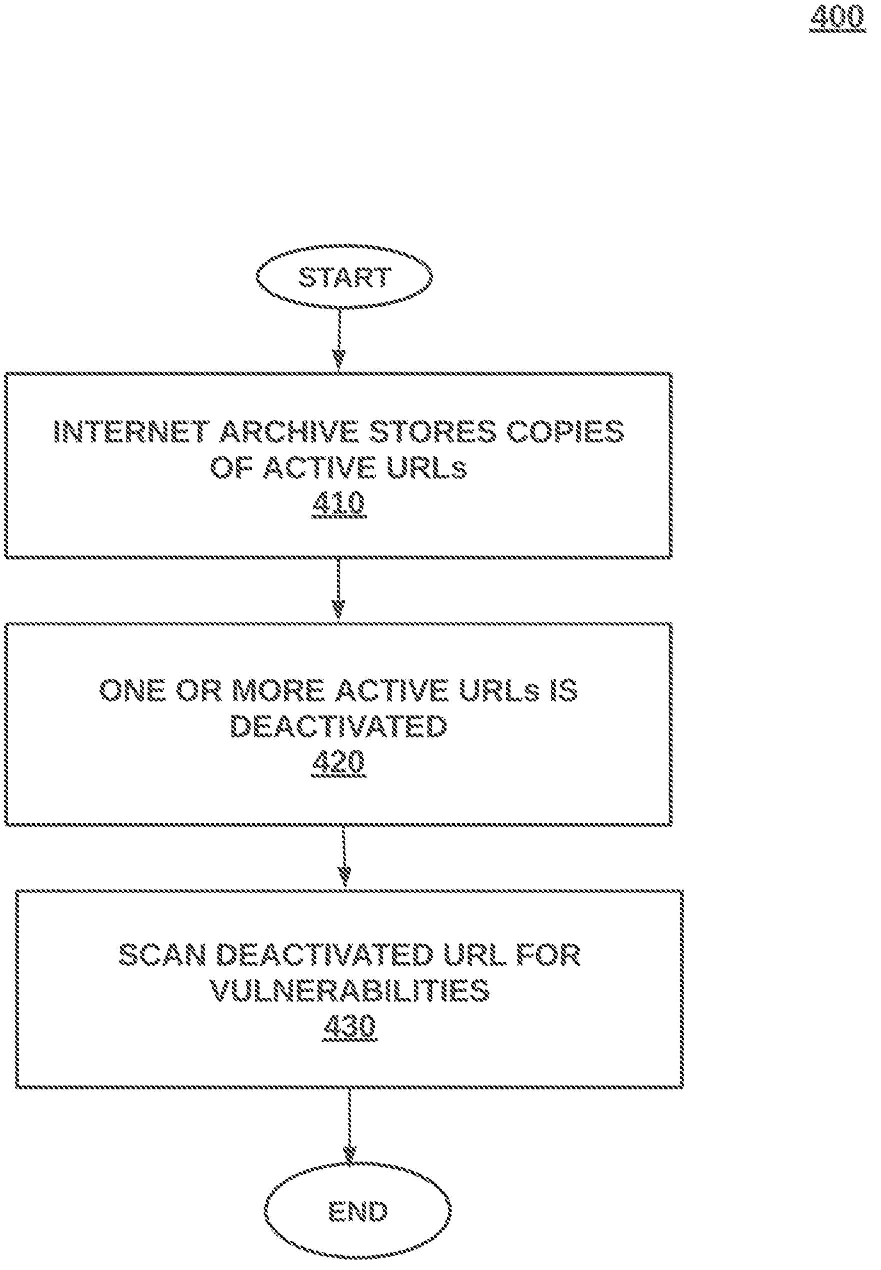
FIG. 4 is a high-level flow diagram illustrating a method for asset crawling with Internet archives for enhanced web application scanning, according to an embodiment.

FIG. 4 is a high-level flow diagram of a method 400 for asset crawling with Internet archives for enhanced web application scanning, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, an Internet archive service stores copies of active URLs. At step 420, one or more active URLs are deactivated. At step 430, a web request for a deactivated URL is scanned for vulnerabilities using the Internet archive copy. In another embodiment, deactivated URLs are scanned in batch without connection to a real-time request.

Figure 5:
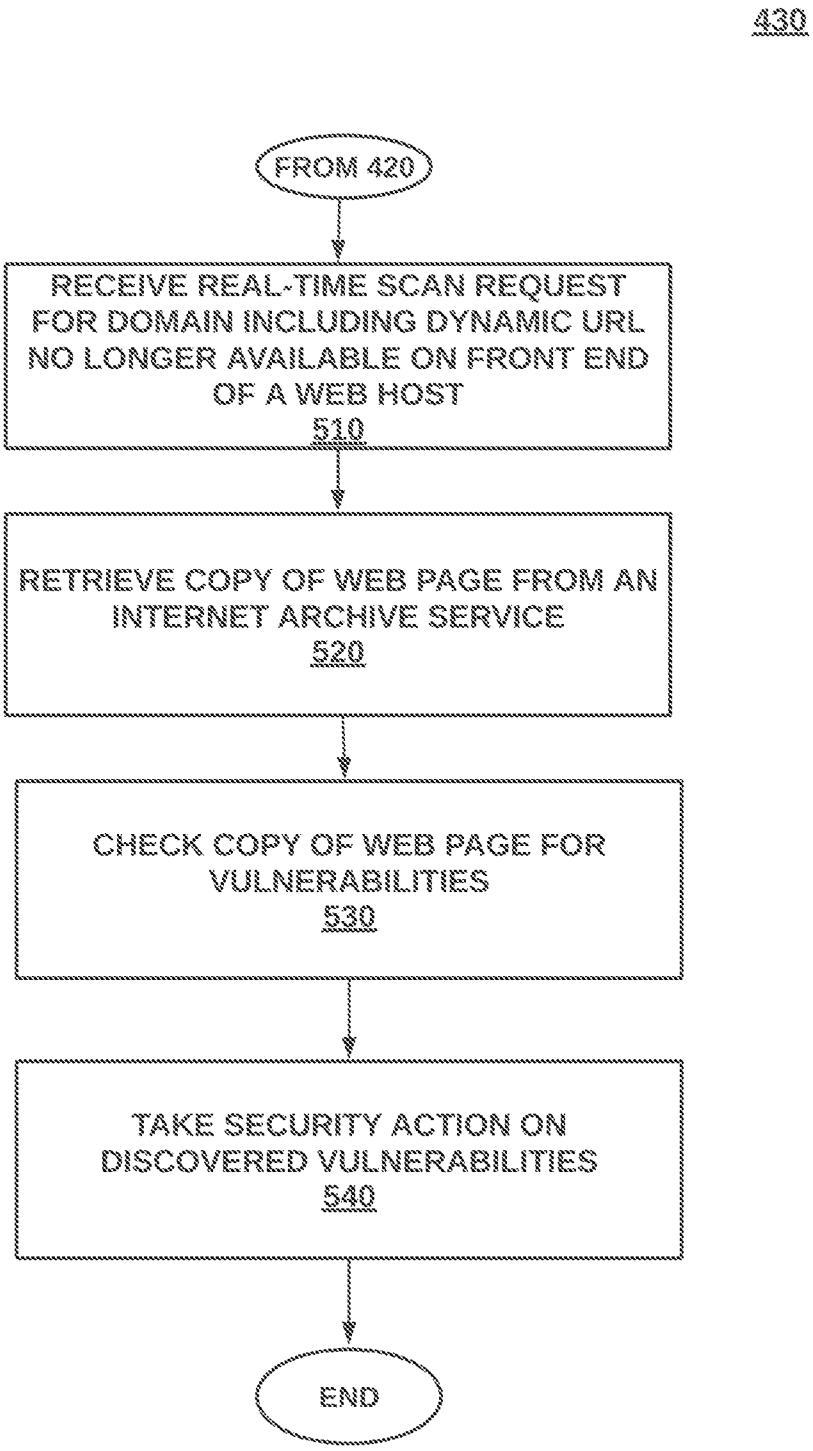
FIG. 5 is a flow diagram illustrating a method for scanning inactive dynamic pages for vulnerabilities, according to one embodiment.

In more detail, as shown in FIG. 5, at step 510, a real-time scan request is received for a domain that includes a dynamic page no longer available on a front end of a web host.

At step 520, responsive to not being available on the front end of the web host, the dynamic page is retrieved from an archive server that stores snapshots of dynamic pages from when they were available on the front of the web host.

At step 530, the dynamic page is checked for vulnerabilities. Responsive to identifying at least one vulnerability on the dynamic page, at step 540, a security action is taken with respect to the at least one dynamic page.

III. Computing Device for Enhanced Web Scanning (FIG. 6)

FIG. 6 is a block diagram illustrating a computing device 600 for use in the system 100 of FIG. 1, according to one embodiment. The computing device 600 is a non-limiting example device for implementing each of the components of the system 100, including network security device 110, the web server 120, and the Internet archive 101. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a network security device, on a data communication network, for asset crawling with Internet archives for enhanced web application scanning, the method comprising:

receiving, in real-time, a scan request for a domain that includes dynamic pages, wherein at least one of the dynamic pages is no longer available on a front end of a web host;

responsive to determining that the at least one dynamic page is no longer available on the front end of the web host, retrieving from an Internet archive server populated by we crawling of web pages, archived page information comprising an archived URL or snapshot information corresponding to the at least one dynamic page, from a time when the at least one dynamic page was available through the front end of the web host the Internet archive server that stores snapshots of dynamic pages from when they were available on the front end of the web host;

using the archived page information retrieved from the Internet archive server to issue a request to a back end of the web host for a resource corresponding to the at least one dynamic page, wherein the resource remains accessible by the back end even though the at least one dynamic page is no longer available on the front end;

checking a response from the back end of the web host for the resource corresponding to the at least one dynamic page for vulnerabilities; and responsive to identifying at least one vulnerability in the response from the back end of the web host, taking a security action with respect to the at least one dynamic page.

2. The computer-implemented method of claim 1, wherein the archived page information comprises a URL that was previously associated with the at least one dynamic page when the at least one dynamic page was available through the front end of the web host.

3. The computer-implemented method of claim 1, wherein the archived page information is retrieved from an Internet archive service comprising at least one of a public archive service, a search-engine archive, a directory service, or a private enterprise archive.

4. The computer-implemented method of claim 1, wherein determining that the at least one dynamic page is no longer available on the front end of the web host comprises determining that the at least one dynamic page is absent from an active crawl of the domain.

5. The computer-implemented method of claim 1, wherein the resource corresponding to the at least one dynamic page comprises an application programming interface endpoint that remains reachable using a valid URL after removal of a corresponding user-interface feature from the front end of the web host.

6. The computer-implemented method of claim 1, wherein the at least one dynamic page became unavailable on the front end of the web host due to replacement by an updated dynamic page, removal of a web-application feature, relocation of web content, deactivation of a URL, testing of a draft URL, or hiding of a URL from crawlers.

7. The computer-implemented method of claim 1, wherein issuing the request to the back end of the web host comprises generating an HTTP request using the archived URL or snapshot information retrieved from the Internet archive server.

8. The computer-implemented method of claim 1, wherein checking the response from the back end of the web host comprises scanning the response for a vulnerability that would be missed by a scanner limited to active front-end URLs of the domain.

9. The computer-implemented method of claim 1, wherein taking the security action comprises blocking, quarantining, flagging, disabling, filtering, reporting, or remediating the resource corresponding to the at least one dynamic page.

10. The computer-implemented method of claim 1, wherein taking the security action comprises generating a notification identifying the resource corresponding to the at least one dynamic page as an inactive front-end resource that remains accessible through the back end of the web host.

11. The computer-implemented method of claim 1, wherein the archived page information is retrieved responsive to the real-time scan request and before completion of a vulnerability scan for the domain.

12. The computer-implemented method of claim 1, wherein a plurality of archived URLs are retrieved from the Internet archive server, and wherein issuing the request to the back end comprises issuing respective requests for resources corresponding to the plurality of archived URLs.

13. The computer-implemented method of claim 12, further comprising filtering the plurality of archived URLS to remove duplicate URLs, non-domain URLs, or URLs corresponding to resources determined to be unavailable at the back end of the web host.

14. The computer-implemented method of claim 1, wherein the at least one dynamic page comprises a page that was previously stored by the Internet archive server during an earlier crawl of the domain and that is unavailable to active scanning of a current version of the domain.

15. The computer-implemented method of claim 1, wherein the network security device operates as a cloud-based security service configured to protect web servers operated by different clients.

16. The computer-implemented method of claim 1, wherein the network security device operates in tandem with a firewall, web application firewall, intrusion prevention system, vulnerability management appliance, or network security appliance.

17. The computer-implemented method of claim 1, wherein the resource corresponding to the at least one dynamic page is a non-active URL that is not run by a current web application front end but remains accessible to requests at the web host.

18. A non-transitory computer-readable medium in a network security device on a data communication network, for asset crawling with Internet archives for enhanced web application scanning, the method comprising:

receiving, in real-time, a scan request for a domain that includes dynamic pages, wherein at least one of the dynamic pages is no longer available on a front end of a web host;

responsive to determining that the at least one dynamic page is no longer available on the front end of the web host, retrieving from an Internet archive server populated by we crawling of web pages, archived page information comprising an archived URL or snapshot information corresponding to the at least one dynamic page, from a time when the at least one dynamic page was available through the front end of the web host the Internet archive server that stores snapshots of dynamic pages from when they were available on the front end of the web host;

using the archived page information retrieved from the Internet archive server to issue a request to a back end of the web host for a resource corresponding to the at least one dynamic page, wherein the resource remains accessible by the back end even though the at least one dynamic page is no longer available on the front end;

checking a response from the back end of the web host for the resource corresponding to the at least one dynamic page for vulnerabilities; and responsive to identifying at least one vulnerability in the response from the back end of the web host, taking a security action with respect to the at least one dynamic page.

19. A network security device, for using fake vulnerabilities for asset crawling with Internet archives for enhanced web application scanning, the deceptive proxy device comprising:

a processor;

a network interface communicatively coupled to the processor and to a data communication network; and a memory, communicatively coupled to the processor and storing:

a web scan module to receive, in real-time, a scan request for a domain that includes dynamic pages, wherein at least one of the dynamic pages are no longer available on a front end of a web host;

an archive API module to, to determining that the at least one dynamic page is no longer available on the front end of the web host, retrieving from an Internet archive server populated by we crawling of web pages, archived page information comprising an archived URL or snapshot information corresponding to the at least one dynamic page, from a time when the at least one dynamic page was available through the front end of the web host the Internet, and to use the archived page information retrieved from the Internet archive server to issue a request to a back end of the web host for a resource corresponding to the at least one dynamic page, wherein the resource remains accessible by the back end even though the at least one dynamic page is no longer available on the front end; and a security module to check a response from the back end of the web host for the resource corresponding to the at least one dynamic page for vulnerabilities, and responsive to identifying at least one vulnerability in the response from the back end of the web host, taking a security action with respect to the at least one dynamic page.

20. The network security device of claim 19, wherein the archive API module is configured to retrieve a plurality of archived URLs from the Internet archive server, and wherein the security module is configured to check back-end responses corresponding to the plurality of archived URLs for vulnerabilities and to block, quarantine, flag, or report at least one archived URL corresponding to a vulnerable back-end resource.

* * * * *